(12) United States Patent
Venkatesan et al.

(10) Patent No.: US 7,536,064 B2
(45) Date of Patent: May 19, 2009

(54) IMAGE COMPARISON BY METRIC EMBEDDINGS

(75) Inventors: Ramarathnam Venkatesan, Redmond, WA (US); Matt Cary, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 11/141,362

(22) Filed: May 31, 2005

(65) Prior Publication Data

US 2006/0269167 A1 Nov. 30, 2006

(51) Int. Cl.
*G06K 9/54* (2006.01)
*G06K 9/68* (2006.01)

(52) U.S. Cl. ........................... 382/305; 382/218
(58) Field of Classification Search .............. 382/305, 382/218
See application file for complete search history.

(56) References Cited

U.S. PATENT DOCUMENTS

| | | | | |
|---|---|---|---|---|
| 6,400,846 B1 * | 6/2002 | Lin et al. | ..................... | 382/199 |
| 6,606,412 B1 * | 8/2003 | Echigo et al. | ............... | 382/224 |
| 6,636,849 B1 * | 10/2003 | Tang et al. | ..................... | 707/6 |
| 2003/0202697 A1 * | 10/2003 | Simard et al. | ............... | 382/195 |
| 2006/0098858 A1 * | 5/2006 | Guittet | ........................ | 382/133 |

OTHER PUBLICATIONS

Felsenstein (The University of Washington) TREEDIST—distances between trees [online], retrieved Dec. 1, 2008. Retrieved from the Internet <URL: http://web.archive.org/web/20050303235754/http://evolution.genetics.washington.edu/phylip/doc/treedist.html>, 7 pages.

Kuhner, F. A Simulation Comparison of Phylogeny Algorithms under Equal and Unequal Evolutionary Rates, Mol. Biol. Evol. 11(3) pp. 459-468, 1994.

* cited by examiner

*Primary Examiner*—Wenpeng Chen
(74) *Attorney, Agent, or Firm*—Lee & Hayes, PLLC

(57) ABSTRACT

Systems and methods are presented for image comparison by metric embeddings. In one implementation, a graph is created from each image to be compared. Graph metrics are then embedded in families of trees for each image. Minimum differences between the respective families of trees for different images are compiled into a matrix, from which a similarity measure is obtained for image comparison.

18 Claims, 6 Drawing Sheets

IMAGE COMPARISON BY METRIC EMBEDDINGS

BACKGROUND

To search for text, images, ideas, websites, etc., on the Internet or in a computing device, a text keyword can be entered to commence the search. Conventionally, searching for an image in a computing environment is limited to entering a text keyword that summarizes the image or entering text that summarizes a visual object or visual characteristic of the image. Conventionally, it has been difficult to search for an image without translating some a key part of the searching to text. Thus, conventional image searches are really text searches.

The difficulty of performing successful image searches lies in the images themselves. An image is far more complex than a word. This is because an image can be modified such that the modified image is mathematically different than the original, yet to the human visual system the two images are visually indistinguishable from each other. Thus, if a user lightens or darkens an image, changes the contrast, fine-tunes the colors, crops, or compresses the image, etc., then parameters that quantify the image have significantly changed, even though the image may appear the same. To avoid this complexity, it has been easier just to summarize the picture with words and then perform a word search for the picture.

What is needed is a way to capture an image mathematically—informationally—so that an image search can be commenced by entering the image itself, and successfully concluded by finding matching versions of the image that may have been modified in many different ways, e.g., by image editing software.

SUMMARY

Systems and methods are presented for image comparison by metric embeddings, that is, in a form through which comparisons can be made digitally without directly relying on visual aspects of the images being compared. In one implementation, a graph, such as an undirected graph having vertices and edges, is created from each image to be compared. Various characteristics of the pixels can be used to create the graph. Creating a graph from an image can be accomplished in part by a wavelet transform technique to obtain coefficient vector values. Noise reduction processes may be added to produce reliable graphs for comparison. For example, after a wavelet transform process, insignificant values can be zeroed and the image or graph can be downscaled.

The graph metrics are then embedded in trees, such as a family of hierarchical well-separated trees (HSTs) for each image. The HSTs for an image can be recursively clustered until the graph representing an image is partitioned.

The families of trees that have the embedded graph information are differentiated to obtain a similarity measure for the images they represent. In one implementation, since the family of trees representing an image is created recursively, the tree differentiation technique is applied iteratively to the root HSTs and their related child trees. In one implementation, the differentiating includes compiling a matrix of minimum differences between images and vectorizing the matrix so that a normalizing process can find an average or median that summarizes the minimum differences between images with a single similarity measure.

DETAILED DESCRIPTION

Overview

The systems and methods described herein provide image comparison techniques. These image comparison techniques can be used to perform Internet image searches or to identify a modified version of a source image from within a pool of images, etc. For example, a user might modify a source image by means of photo editing software, or by cropping and compressing the source image in preparation for including the image in an email message. The systems and method described herein provide a way to search for and find such a modified image from among other images.

Figure 1:
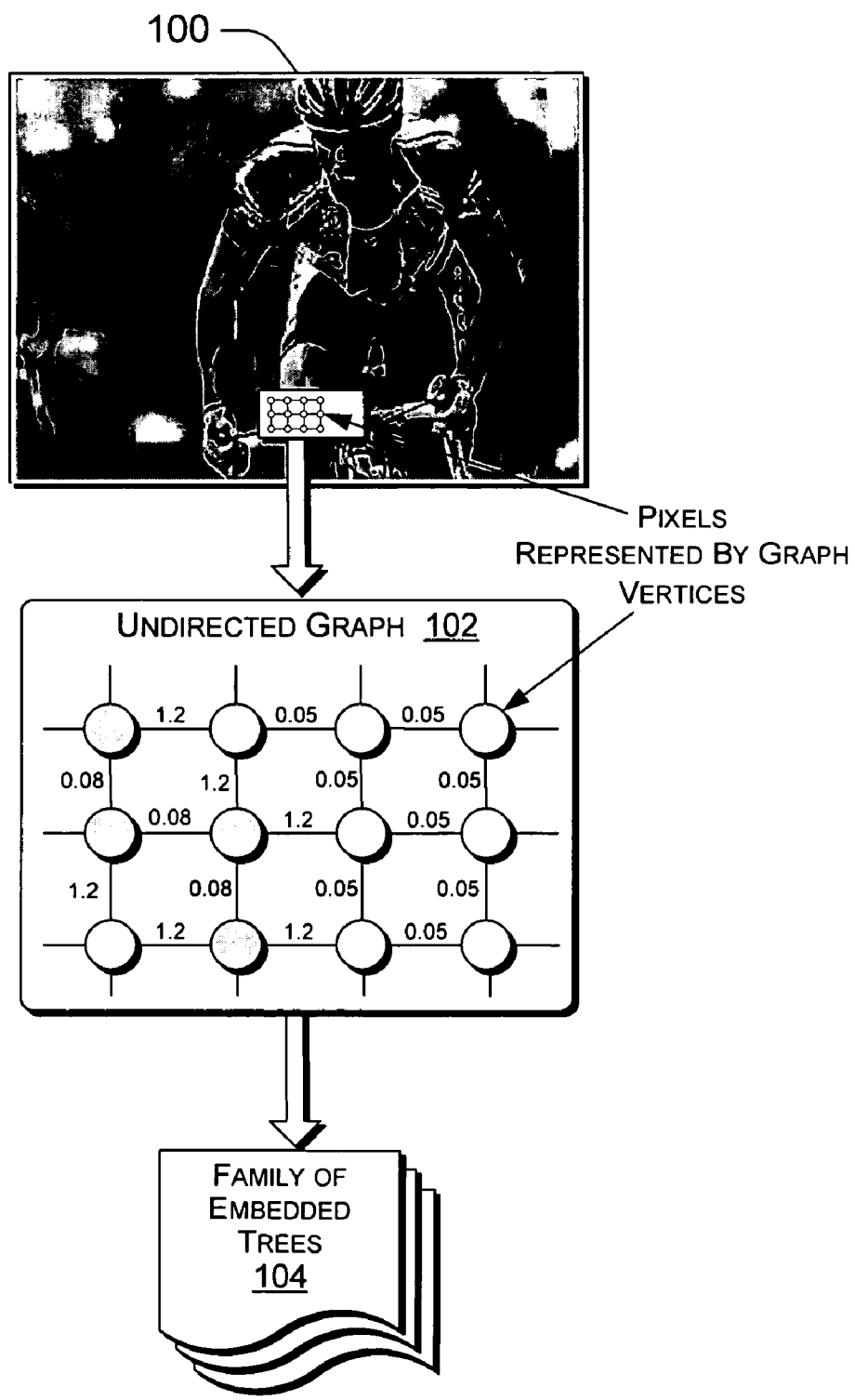
FIG. 1 is a diagram of an exemplary graph representing an image.

FIG. 1 shows an exemplary implementation of an image comparison method in which the pixel values of an image 100 are represented by an undirected graph 102. Each vertex in the undirected graph 102 represents a corresponding pixel in the image. In one implementation, an image preprocessing stage that forms the graph 102 includes application of a wavelet transform that establishes coefficient vector values, dropping values that are too small—below a selected threshold. Edges between vertices in the undirected graph 102 can be weighted according to the difference in value between the pair of pixels at either end of an edge. The pixel characteristic to be used for determining the weighting of the edges can be selected from among many different types of pixel characteristics, such as intensity, energy, etc. The resulting undirected graph 102 can then be downscaled to save processing power and reduce noise. Such an undirected graph 102 may be referred to loosely herein as a preprocessed image, because further processing follows the graph formation process.

A family of trees 104, such as hierarchical well-separated trees embedded with graph metrics can be derived from the undirected graph 102 created in the above image preprocessing stage. The family of trees 104 is established by a clustering method that recurses an initial cluster through enough iterations to partition the preprocessed image into well-separated trees. A typical family of trees 104 for this method includes approximately ten (parent and child) trees.

Figure 2:
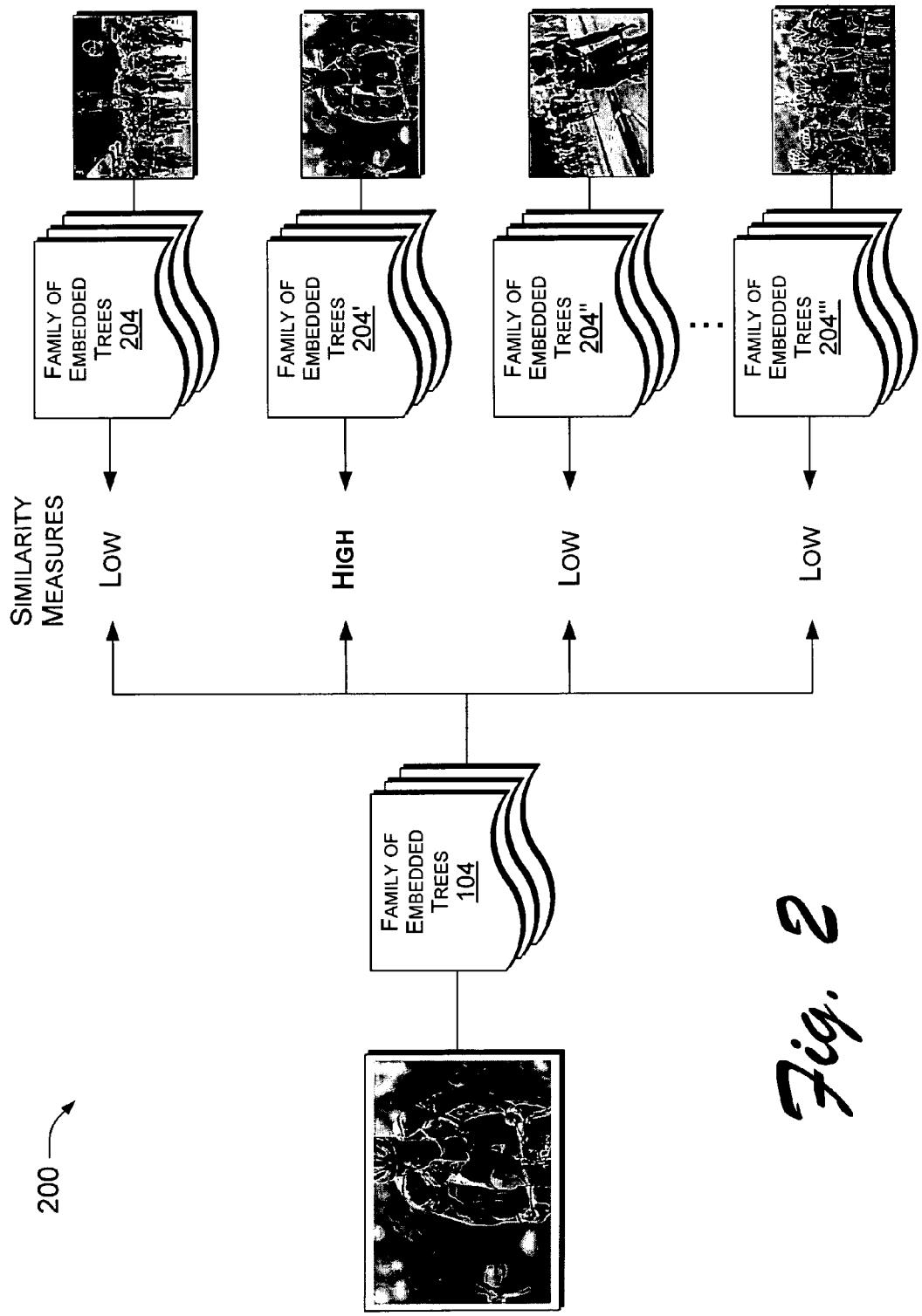
FIG. 2 is a diagram of exemplary image comparison via differentiating families of trees embedded with graph metrics.

As shown in FIG. 2, to find an image among a group of images, a differentiating technique finds a similarity measure between a family of trees 104 for the source image and each family of trees (e.g., 204, 204', 204'', 204''') for multiple other images to be compared. The image with the highest similarity measure to the source image 100 is selected as the best match.

In one implementation, the differentiating technique just introduced works by assigning shape vectors to each node of each tree, and adopting similarity measure values that result in the minimum difference between the corresponding nodes for different images being compared. That is, across the trees in the two families of trees representing two images, a matrix of differences is aggregated. This matrix is assigned a vector and then components of the vector are averaged or otherwise normalized to establish a similarity score. Thus, for finding a copy of an image or a modified version of the image from among a pool of images, the similarity scores can be compared to reveal the likely match.

Exemplary System

Figure 3:
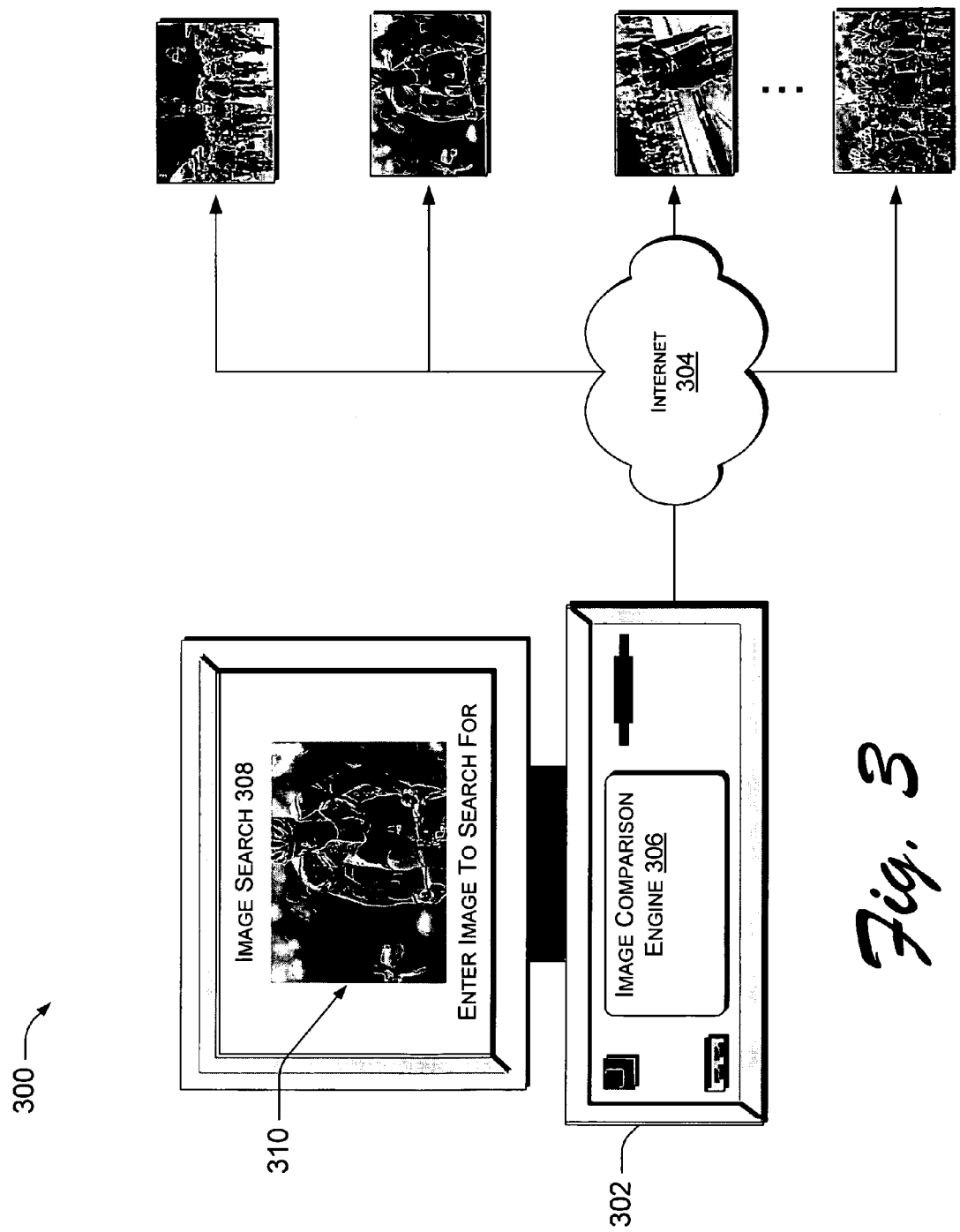
FIG. 3 is a diagram of an exemplary image comparison system.

FIG. 3 shows an exemplary system 300 for comparing images. A computing device 302 is communicatively coupled with the Internet 304. The computing device 302 hosts an image comparison engine 306. This type of networked computing environment is shown only for the sake of example. Other types of computing and network environments can also host the subject matter. The image comparison engine 306 makes an image search 308 possible. A target or "source" image 310 can be selected by a user or by a component of the system 300. The image comparison engine 306 compares the source image 310 with other images, e.g., found on the Internet 304, and returns a similarity measure for each comparison. The image comparison engine 306 can designate the best match between a source image 310 and members of a set of candidate images.

Instead of searching a set of images from the Internet 304, the image comparison engine 306 can also search a set of images in a file directory, in a database, or stored as attachments to email messages in a folder, etc.

Exemplary Engine

Figure 4:
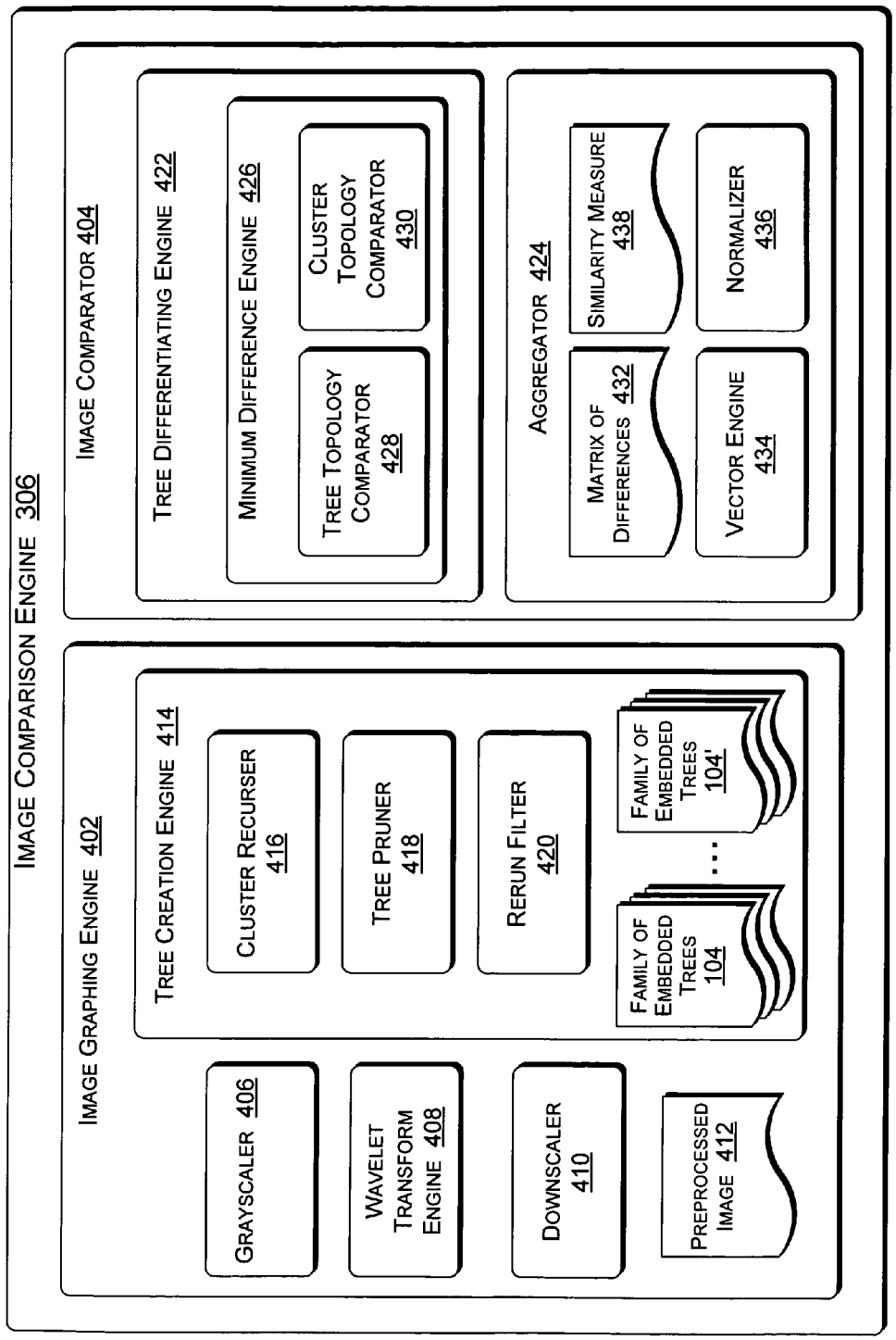
FIG. 4 is a block diagram of an exemplary image comparison engine.

FIG. 4 shows the exemplary image comparison engine 306 of FIG. 3 in greater detail. The image comparison engine 306 of FIG. 4 is meant to provide one example arrangement for the sake of overview. Many other arrangements of the illustrated components, or similar components, are possible. Such an image comparison engine 306 can be executed in hardware, software, or combinations of hardware, software, firmware, etc.

The illustrated example arrangement of an image comparison engine 306 includes an image graphing engine 402 and an image comparator 404. The image graphing engine 402 produces graphs and families of trees 104 that represent images, while the image comparator 404 finds similarity measures between the families of trees 104 in order to try to match a candidate image with a source image 100.

The image graphing engine 402 further includes image preprocessing components: a grayscaler 406, a wavelet transform engine 408, and a downscaler 410. These components produce a preprocessed image 412, that is, a graph from which a family of trees 104 can be produced to represent the image 100 and allow comparison of images. The image graphing engine 402 further includes a tree creation engine 414. The tree creation engine 414 further includes a cluster recurser 416, a tree pruner 418, and a rerun filter 420. These produce various families of trees (e.g., 104, 104') embedded with graph metrics for representing different images.

The image comparator 404 introduced above further includes a tree differentiating engine 422 and an aggregator 424. The tree differentiating engine 422 further includes a minimum difference engine 426, which further includes a tree topology comparator 428 and a cluster topology comparator 430. The aggregator 424 further includes a matrix of differences 432; as well as a vector engine 434 and a normalizer 436 that produces a similarity measure 438 quantifying similarity between a pair of images.

Image Graphing Engine

In the image preprocessing components of the image graphing engine 402, the grayscaler 406 can receive a color RGB image input and convert the input into grayscale, e.g., by the L2 norm of the RGB values.

In one implementation, the wavelet transform engine 408 performs a three level Haar wavelet transform. Small values in the resulting coefficient vectors can be thresholded to zero, that is, coefficients smaller in absolute value than a threshold, e.g., 0.15, are changed to zero. A wavelet reconstruction procedure is then applied to these coefficient vectors, and the downscaler 410 scales down the results to approximately 70 pixels in width to produce the preprocessed image 412.

The tree creation engine 414 produces k hierarchical well-separated trees (HSTs) from the preprocessed image 412. Typically, k=10. These HSTs can be produced by a recursive, hierarchical clustering decomposition. The tree creation engine 414 begins by setting an initial cluster of graph nodes $C_0$ equal to the preprocessed image 412. A cluster size parameter is then designated by r and the number of pixels in the preprocessed image 412 is designated by N. Typical values for r are between approximately 1 and approximately 2. Some tuning of the r parameter may improve results.

The cluster recurser 416 selects a cluster $C_i$ and chooses a random point $x \in C_i$. If all the points of $C_i$ are within a distance r(log N) from x, wherein the distances are measured in pixels, no further processing is necessary and $C_i$ is returned as the tree. Otherwise, a radius d is then chosen from an inverse-type distribution. That is, if the preprocessed image 412 contains N pixels, then for a given value of parameter r, the cluster recurser 416 selects an y value uniformly [0, 1] and sets d=−r(log N)(log x).

The cluster recurser 416 then sets $C_{i+1}$=B(x, d), so that a ball is centered at a new x at radius d and recursively constructs a tree at $C_{i+1}$, and sets C'=$C_i/C_{i+1}$. wherein C'=$C_{i+1}$ is standard mathematics notation for set exclusion terminology. This procedure is repeated substituting C' for $C_i$. The recursive trees thus constructed form the children of $C_i$, until $C_i$ is partitioned. The resulting trees are a family of HST trees 104 with embedded metrics of the preprocessed image 412.

The tree pruner 418 reduces the effects of noise in the image comparisons by pruning nodes whose corresponding clusters contain less than a certain threshold number of pixels, typically 100 pixels. It should be noted that $C_{\{i+1\}}$=B{x, d}∩$C_i$, that is, the cluster is not identical to the ball but is the set of pixels contained within the ball. A set of pixels in generally is not very ball-like, so the shape vectors described below take on additional significance. In one implementation, the tree pruner 418 can obviate the initial step of making sure the size of a cluster is at most r(log N) by pruning small nodes at the end of tree creation.

Likewise, the rerun filter 420 reduces noise by rerunning the entire tree creation process if a resulting tree has fewer than a threshold number of nodes, for example, less than six nodes. In other words, a small tree is an indication of poor clustering and the tree should be recreated with different clustering parameters.

Image Comparator

In the illustrated example of an image comparator 404, the tree differentiating engine 422 receives a tree, such as an HST, from the family of trees 104 for a source image 100. The tree differentiating engine 422 likewise receives a tree from the family of trees 104' of a candidate image.

Given these two trees—e.g., HSTs—the tree differentiating engine 422 has a minimum difference engine 426 that produces a difference measure between them. In one implementation, the tree topology comparator 428 takes into account the topology of the trees while the cluster topology comparator 430 takes into account the topology of the clusters associated with the tree nodes. Given a child HST, the minimum difference engine 426 scales the weight of each edge, e.g., with the diameter of the parent. To each node v the minimum difference engine 426 assigns a vector $a_v \in R^4$ by concatenating the location of the cluster at v with two shape parameters $d_{min}$ and $d_{max}$. These are found by computing the convex hull H of the cluster at v, and setting $d_{max}$ to be the maximum distance between any two points in H, and also $d_{min} = \min_{x \in H} \max y \in H \rho(a, b)$ where $\rho(a, b)$ is the distance from x to y in the image graph.

Figure 5:
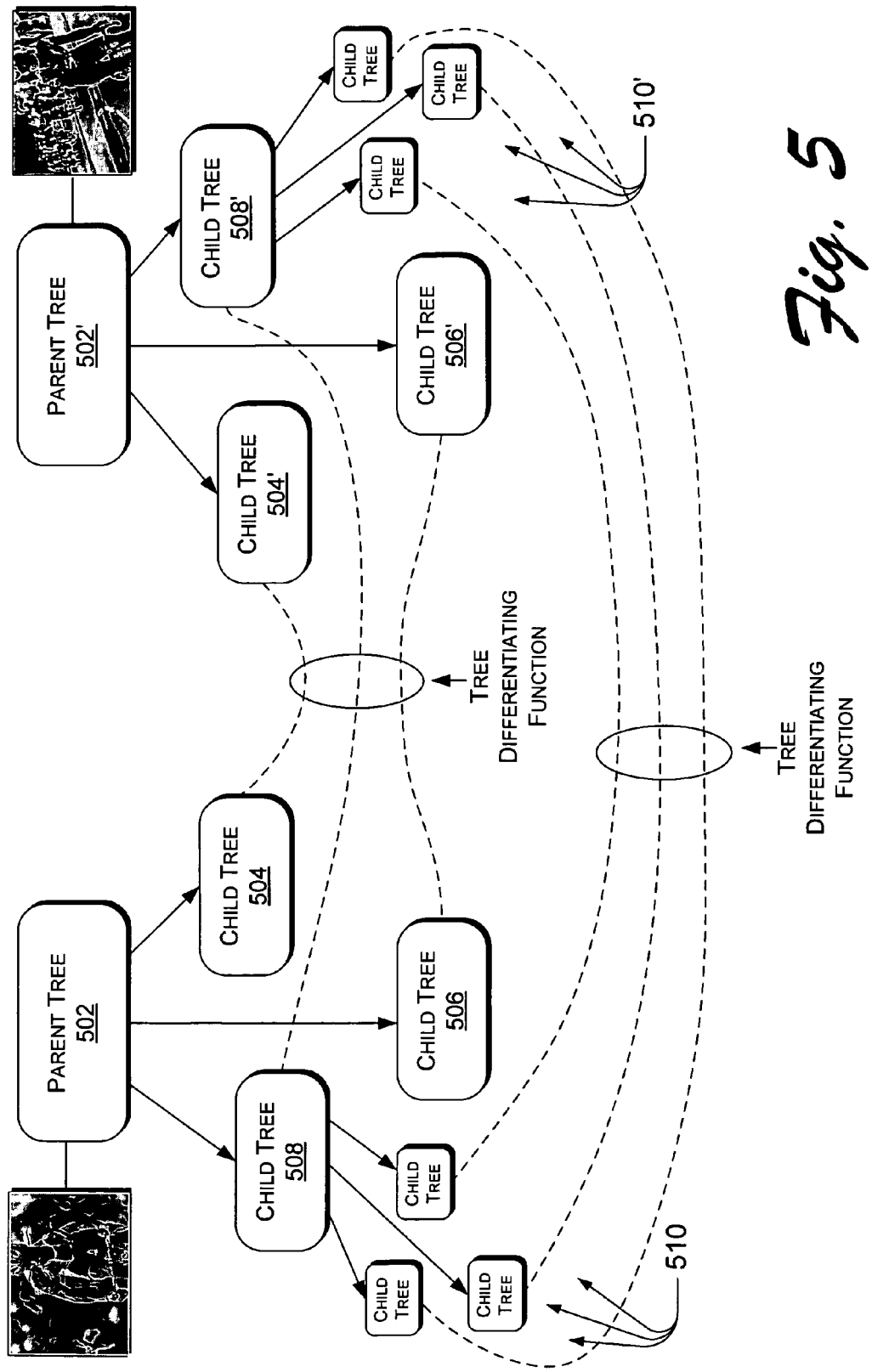
FIG. 5 is a diagram of exemplary comparison of images via iterative comparison of sets of child nodes.

As shown in FIG. 5, given two HSTs T 502 and U 502', the tree differentiating engine 422 recursively computes a tree differentiating function "treediff(T, U)", and maps between sets of child nodes. The children of the roots of T 502 and U 502' are set respectively, to $\{t_i\}_{i=1}^{k_T}$ and $\{u_j\}_{j=1}^{k_U}$. The tree differentiating engine 422 lets $\delta_{ij} = \|\alpha_{t_i} - \alpha_{u_j}\|$, where $\alpha_v$ is the shape vector in $R^4$ described above. The minimum difference engine 426 then lets $s_1$ be the pair (i, j) that minimizes $\delta_{ij}$; $s_2$ the pair that minimizes $\delta_{ij}$ with the row and column of $s_1$ removed, etc. This sequence of $s_i$ describes a matching between the children of the root of T 502 and those of the root of U 502'. If $k_T \neq k_U$, then several children trees will be unmatched.

The tree differentiating engine 422 recursively computes the treediff function on the matched children (e.g., a top level of matched children (504, 504'); (506, 506'); (508, 508'); and successive levels of matched children, such as (510, 510'), etc.), producing $d_i$ from the pair $s_i$. To $\Sigma d_i$, the tree differentiating engine 422 then adds the difference of edge weights of each matched pair, and the difference of the $\alpha_v$ vectors. If there are any unmatched children of T or U, the tree differentiating engine 422 adds the total edge weight of those subtrees (but does not use the $\alpha_v$ vectors). The tree differentiating engine 422 obtains the resulting total, which is the value of the treediff function for T and U.

In one implementation, in addition to matching children by the minimums of the shape vector, the tree differentiating engine 422 performs several levels of exhaustive search as well. In some circumstances this may provide better results. If treediff(T, U, 0) is the differentiating function described above, then treediff(T, U, d) aims to produce all possible matching between the children of T and U. Thus, from a top level, the tree differentiating engine 422 calls treediff(T, U, d−1) for each pair in each matching, and returns the mathematical minimum, over all matchings, of the total value of the matching. Because the tree pruner 418 described above generally optimizes the trees by pruning nodes whose corresponding clusters contain less than a certain threshold number of pixels, the number of children of T and U is not large. Producing an exhaustive matching is feasible because typical values for d in a top-level call to treediff(T, U, d) are only 2 or 3.

In the context of a comparison of two images (e.g., G and H) to obtain a similarity measure, the image graphing engine 402 described above computes k HSTs from each image (typically k=10). The family of trees (104, 104') for each image are $\{T_i\}$ and $\{U_i\}$, respectively, where $1 \leq i \leq k$. The aggregator 424 forms $\Delta_{ij}$=treediff($T_i$,$U_j$) as the matrix of differences 432. The vector engine 434 forms a vector d by $d_i = \min_j \Delta_{ij}$. In some implementations, this minimum operation is not symmetric, thus $\Delta_{ij} \leq \Delta_{ji}$. The normalizer 436 then aggregates the results of the treediff function: $\Delta(G, H)$=mean(d) or $\Delta(G, H)$=median(d). The latter, aggregation by the median, may give better results in some implementations, perhaps because it is less sensitive to outlier values (similar to a median filter versus an averaging filter used for a noisy image).

In a variation, an edge detector (not shown) is used for clustering in the tree creation engine 414. Thus, after the low-pass effect of the wavelet transform engine 408, images can be processed through a Canny edge filter (not shown), and the resulting trees clustered. Because the Canny edge filter does not guarantee that objects are surrounded by a closed edge curve, the image graph used for the HST in this case can be created using Gaussian averaging to compute pixel value differences. This has the effect of discouraging the clustering from crossing small gaps between edge endpoints. When the tree differentiating engine 422 applies the Canny edge filter in this manner, the resulting HSTs produce favorable results in many circumstances.

Exemplary Methods

Figure 6:
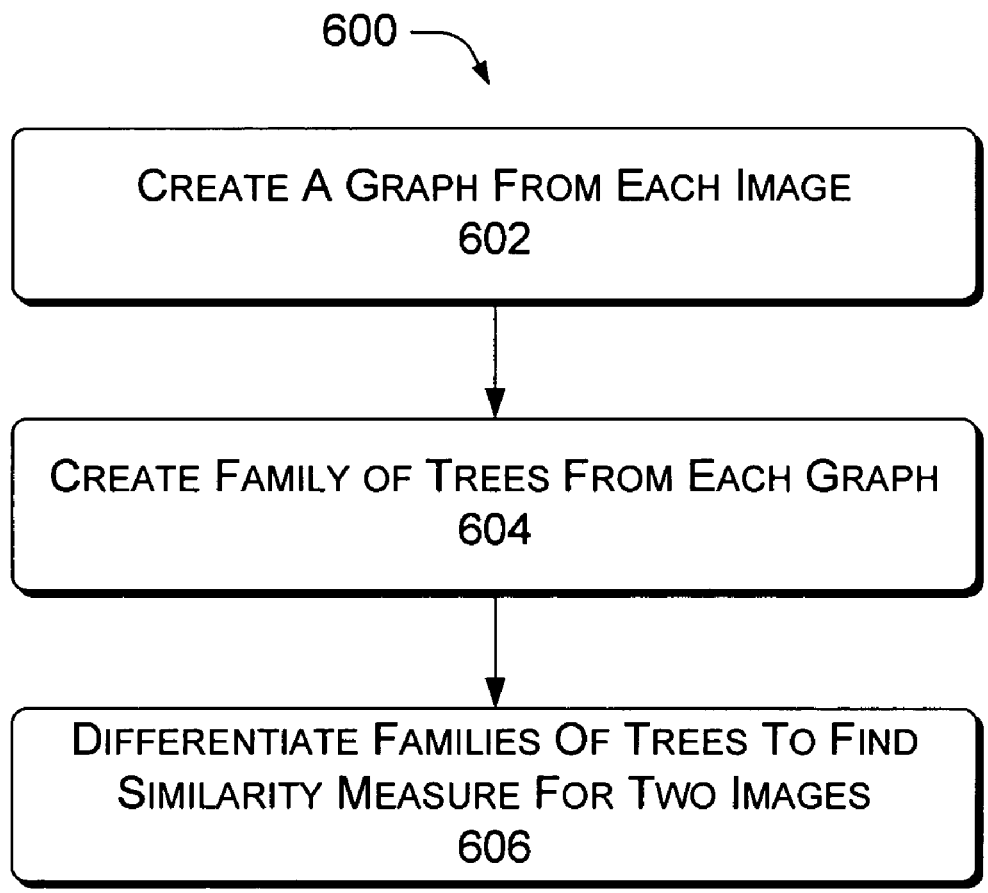
FIG. 6 is a flow diagram of an exemplary method for image comparison.

FIG. 6 depicts an exemplary method 600 for image comparison. In the flow diagram, the operations are summarized in individual blocks. The exemplary method 600 may be performed by hardware, software, or combinations of both, for example, by components of the exemplary image comparison engine 306.

At block 602 a graph is created from each image to be compared. Representing an image by a graph, such that the image can be digitally compared for similarity or dissimilarity with other images, involves reliably quantifying the pixels making up the image, e.g., by weighting graph edges with the values of the differences of adjacent pixels in the image. If the image is color, then color components of pixels can be used to create the graph, or the color image can be grayscaled and various other non-color characteristics of the pixels can be used to create the graph. An engine to create a graph from an image, for example, the exemplary image comparison engine 306, may include other preprocessing components to make the graph a reliable indicator of the image for the sake of comparisons.

Creating a graph from an image can be facilitated by a wavelet transform to obtain coefficient vector values. One of the main factors in producing a reliable graph for purposes of comparing images is eliminating irrelevant noise from the graph. Thus, after the wavelet transform, insignificant values can be zeroed thereby decreasing the total amount of information that the method has to deal with. Creating a graph may also benefit from downscaling the image and/or the graph to an efficient size.

At block 604, a family of trees is created for each graph. In this part of the exemplary method 600, the graphs which represent the images to be compared, while quantifying the images, still do not lend themselves easily to mathematical comparison techniques that can be carried out digitally. Thus, instead of trying to compare graphs directly, the metrics of each graph are embedded into a family of trees. Hierarchical well-separated trees (HSTs), for example, lend themselves well to mathematical comparison techniques that can be carried out digitally with efficiency. Thus, an image becomes a graph, which in turn becomes a related family of trees. Clusters and nodes of the trees allow images to be compared mathematically, i.e., in a form that can be manipulated digitally and does not directly rely on visual qualities of images, for comparisons.

At block 606, the families of trees for two images to be compared are differentiated from each other to obtain a similarity measure. In other words, the families of trees that have the embedded graph information are compared to obtain a similarity measure for the images they represent. In one implementation, since the family of trees representing an image is created recursively, the tree differentiation technique is applied iteratively to the root HSTs and their related child trees. In one implementation, the differentiating includes compiling a matrix of differences and vectorizing the matrix so that an averaging process (or finding a median) can summarize the differences with a single similarity measure.

The systems and methods described herein may embed graph metrics into tree metrics with approximate low-distortion. Given a general graph defining a metric, an embedding into a tree metric has $\Omega(n)$ distortion (where n is the number of points in G). However, given a graph G, a family of tree metrics $\{T_i\}$ along with embeddings $G \rightarrow T_i$ (such that, given any two points, x, y $\in$ G) the expected distortion of x, y $\rightarrow T_i$ over a random choice of $T_i$ is O(log n).

Conclusion

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems and methods for image comparison. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-executable method facilitating comparison of images, the method being executable on a tangible computer, the method comprising:

on the computer, representing a first image as a first graph and a second image as a second graph, wherein each vertex in the first and second graphs corresponds to a pixel in the respective images;

on the computer, assigning a weight to each edge between vertices in each undirected graph, wherein the weight corresponds to a difference between adjacent pixel values;

on the computer, deriving a first family of trees from the first graph and a second family of trees from the second graph, wherein graph metrics are embedded in the families of trees;

on the computer, wherein deriving each family of trees comprises deriving hierarchical well-separated trees by recursive hierarchical clustering decomposition of an image, including:

on the computer, selecting a cluster of pixels from the image, a random pixel location x in the cluster of pixels, a cluster size $r_1$ and a radius d equal to—r(log N)(log X) where N is a number of pixels in the image;

on the computer, generating child clusters of the cluster of pixels until the cluster of pixels is partitioned, wherein the generating includes recursively constructing child clusters at successive radii from $x_1$ wherein each child cluster is set to the ratio of the previously obtained cluster divided by the cluster at the current radius;

on the computer, determining a difference measure for the first and second images based on a difference measure between the first and second families of trees; and on the computer, indicating the determined difference measure, whereby the indicating the determined difference measure facilitates a comparison of images, namely the first image and the second image.

2. The computer-executable method as recited in claim 1, wherein representing the first and second images as first and second graphs includes processing each image with a wavelet transform.

3. The computer-executable method as recited in claim 2, wherein the wavelet transform comprises a three level Haar wavelet transform.

4. The computer-executable method as recited in claim 2, further comprising, on the computer, downscaling each image to reduce noise resulting in a preprocessed image.

5. The computer-executable method as recited in claim 2, further comprising, on the computer, downscaling each image to approximately 70 pixels in width to form a preprocessed image.

6. The computer-executable method as recited in claim 1, wherein determining a difference between the first family of trees and the second family of trees includes comparing a topology of the first family of trees and the second family of trees and comparing a topology of clusters associated with tree nodes of the first and second families.

7. The computer-executable method as recited in claim 1, wherein determining a difference between the first family of trees and the second family of trees includes computing a convex hull of a cluster associated with each node of the first family of trees and the second family of trees to obtain shape parameters for that node, assigning a shape vector to each node by concatenating the location of the cluster associated with the node with the shape parameters, and finding a difference measure that minimizes a difference between the shape vectors for respective sets of child nodes of the first and second families of trees.

8. The computer-executable method as recited in claim 7, further comprising, on the computer, aggregating differences over the nodes of the trees by forming a vector of the minimized differences of the shape vectors and normalizing components of the vector.

9. The computer-executable method as recited in claim 1, further comprising, on the computer, successively repeating the method for the first image and members of a set of images, to find the member of the set with the highest similarity to the first image.

10. One or more tangible computer-readable media having embodied thereon computer-executable instructions that, when executed by a computer, perform a method facilitating comparison of images, the method comprising:

on the computer, representing a first image as a first graph and a second image as a second graph, wherein each vertex in the first and second graphs corresponds to a pixel in the respective images;

on the computer, assigning a weight to each edge between vertices in each undirected graph, wherein the weight corresponds to a difference between adjacent pixel values;

on the computer, deriving a first family of trees from the first graph and a second family of trees from the second graph, wherein graph metrics are embedded in the families of trees;

on the computer, wherein deriving each family of trees comprises deriving hierarchical well-separated trees by recursive hierarchical clustering decomposition of an image, including:

on the computer, selecting a cluster of pixels from the image, a random pixel location x in the cluster of pixels, a cluster size $r_1$ and a radius d equal to—r(log N)(log x) where N is a number of pixels in the image;

on the computer, generating child clusters of the cluster of pixels until the cluster of pixels is partitioned, wherein the generating includes recursively constructing child clusters at successive radii from x, wherein each child cluster is set to the ratio of the previously obtained cluster divided by the. cluster at the current radius;

on the computer, determining a difference measure for the first and second images based on a difference measure between the first and second families of trees; and on the computer, indicating the determined difference measure, whereby the indicating the determined difference measure facilitates a comparison of images, namely the first image and the second image.

11. One or more tangible computer-readable media as recited in claim 10, wherein representing the first and second images as first and second graphs includes processing each image with a wavelet transform.

12. One or more tangible computer-readable media as recited in claim 11, wherein the wavelet transform comprises a three level Haar wavelet transform.

13. The One or more tangible computer-readable media. as recited in claim 11, further comprising, on the computer, downscaling each image to reduce noise resulting in a preprocessed image.

14. One or more tangible computer-readable media as recited in claim 11, the method further comprising, on the computer, downscaling each image to approximately 70 pixels in width to form a preprocessed image.

15. One or more tangible computer-readable media as recited in claim 10, wherein determining a difference between the first family of trees and the second family of trees includes comparing a topology of the first family of trees and the second family of trees and comparing a topology of clusters associated with tree nodes of the first and second families.

16. One or more tangible computer-readable media as recited in claim 10, wherein determining a difference between the first family of trees and the second family of trees includes computing a convex hull of a cluster associated with each node of the first family of trees and the second family of trees to obtain shape parameters for that node, assigning a shape vector to each node by concatenating the location of the cluster associated with the node with the shape parameters, and finding a difference measure that minimizes a difference between the shape vectors for respective sets of child nodes of the first and second families of trees.

17. One or more tangible computer-readable media as recited in claim 16, the method further comprising, on the computer, aggregating differences over the nodes of the trees by forming a vector of the minimized differences of the shape vectors and normalizing components of the vector.

18. One or more tangible computer-readable media as recited in claim 16, the method further comprising, on the computer, successively repeating the method for the first image and members of a set of images, to find the member of the set with the highest similarity to the first image.

* * * * *